United States Patent Office.

HENRY LISTER, OF HOUSTON, TEXAS

Letters Patent No. 111,655, dated February 7, 1871.

IMPROVEMENT IN MEDICAL COMPOUNDS.

The Schedule referred to in these Letters Patent and making part of the same.

*To all whom it may concern:*

Be it known that I, HENRY LISTER, of Houston, in the county of Harris and State of Texas, have invented a new and useful Improvement in Medical Compounds; and I do hereby declare that the following is a full, clear, and exact description thereof, which will enable others skilled in the art to make and use the same.

This invention and discovery relate to a new and valuable remedy for chills and fever, and consist in the use of what is commonly known as iron-weed—botanical name, *verbena urticifolia*—mascerated and combined with alcohol, as hereinafter more fully described.

In carrying out my invention and discovery and preparing the medicine for use in cases of fever and ague, or chills and fever, I take six ounces of the iron-weed—*verbena urticifolia*—and macerate the same and make an extract by the use of one quart of alcohol. When the strength of the iron-weed has thus been extracted by the alcohol, I add one pint of distilled water. The liquid is now thoroughly filtered and strained, when it is ready for bottling and use.

This medium has been thoroughly tested in localities where chills and fever prevail, and has been found to be a specific for this class of diseases, possessing all the virtues of the celebrated "Peruvian bark" and "quinine," without producing the ill effects which follow the use of the latter.

Having thus described my invention,

I claim as new and desire to secure by Letters Patent—

The above-described medical compound, substantially as and for the purposes set forth.

HENRY LISTER.

Witnesses:
G. DREYLING,
GEORGE KIDD.